(No Model.) 2 Sheets—Sheet 2.
C. R. DOLLARHIDE.
CHECK ROW PLANTER.

No. 304,915. Patented Sept. 9, 1884.

WITNESSES:
H. B. Brown
A. G. Lepue

INVENTOR:
Charles R. Dollarhide
BY Munn & Co.
ATTORNEYS.

UNITED STATES PATENT OFFICE.

CHARLES R. DOLLARHIDE, OF PARIS, ILLINOIS.

CHECK-ROW PLANTER.

SPECIFICATION forming part of Letters Patent No. 304,915, dated September 9, 1884.

Application filed December 11, 1883. (No model.)

*To all whom it may concern:*

Be it known that I, CHARLES R. DOLLARHIDE, of Paris, in the county of Edgar and State of Illinois, have invented a new and useful Improvement in Check-Row Planters, of which the following is a full, clear, and exact description, reference being had to the annexed drawings, forming part of this specification.

My invention relates to check-row planters in which the seed-dropping mechanism is operated by an endless chain, which is made to travel on suitable wheels by means of projections on the chain, which are placed in contact with the ground; and the invention consists of the novel construction hereinafter described and claimed.

Figure 1:
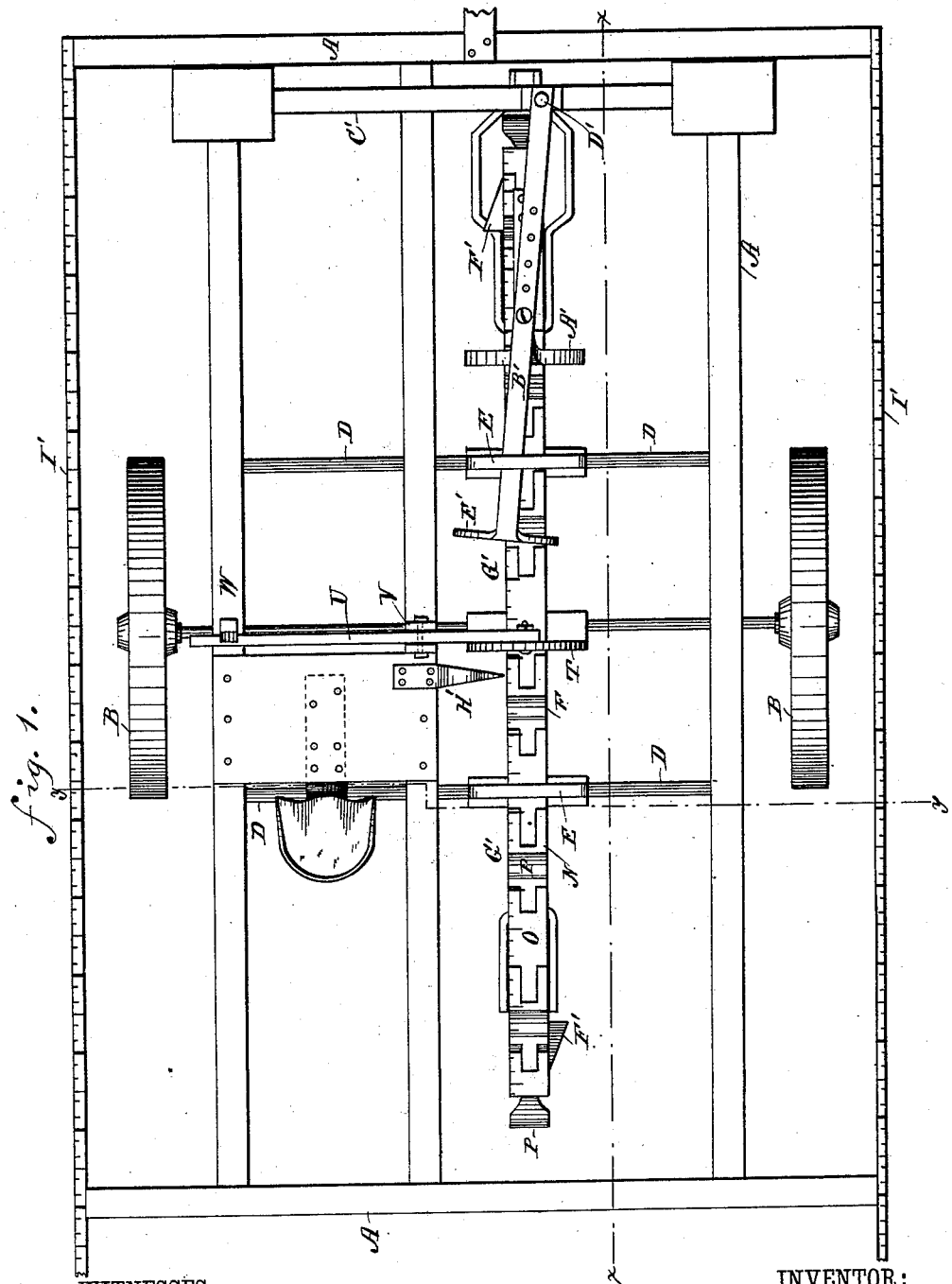
Figure 2:
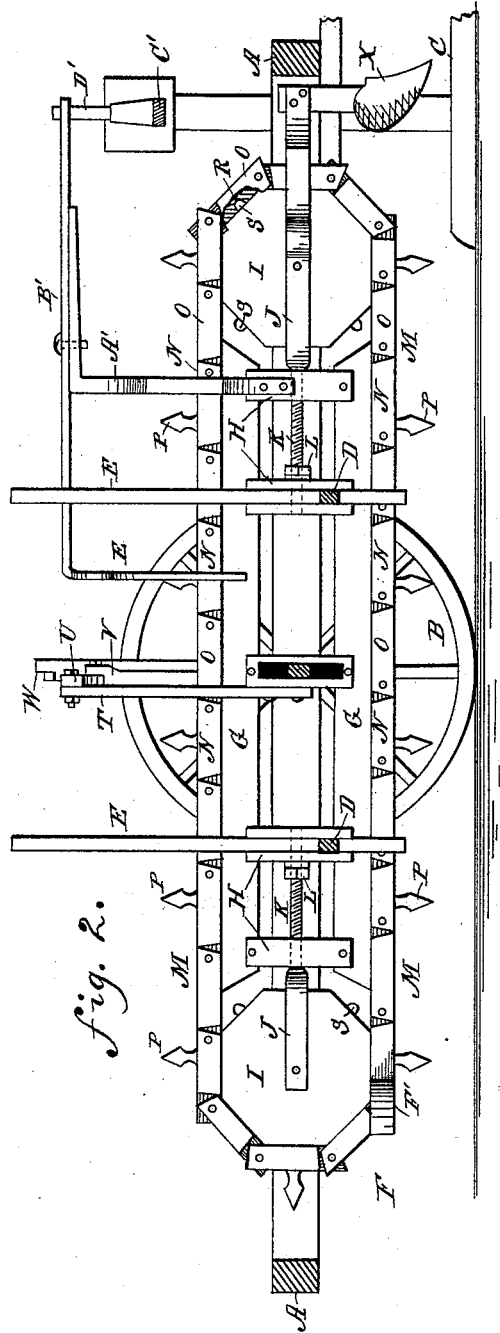
Figure 3:
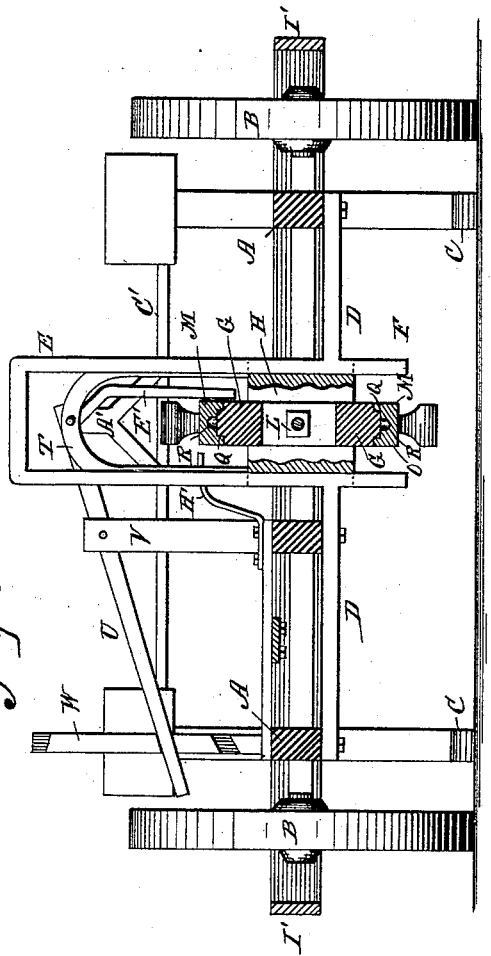

In the drawings, Figure 1 is a plan view of my improved check-row planter. Fig. 2 is a longitudinal section of the planter, taken on line $x$ $x$ of Fig. 1, and showing the device partly broken away, and Fig. 3 is a transverse section of the planter, taken on the line $y$ $y$ of Fig. 1.

A indicates any suitable frame-work, supported on two-wheels, B, and the runners C. On two divided cross-rods, D, are rigidly supported in the longitudinal center of the frame two vertical stirrups, E, in which the chain-carrying frame F is fitted and adapted to have vertical movement for adjusting the chain in and out of contact with the ground. The frame F consists of two horizontal guide-bars, G, located one above another, and connected together by vertical standards H, and two polygonal sprocket-wheels, I, located at opposite ends of said frame, and supported in arms J, having threaded shanks K, which are movably supported in the standards H, and provided with nuts L, for adjusting them inwardly or outwardly to regulate the tension of the chain. The chain (shown at M) consists of a series of links, N O, pivoted together in alternate order, of which the links N are provided on their outer surfaces with wedge-shaped projections P, adapted to be inserted into the ground by the forward movement of the planter. The links N O, which are of a length corresponding to the faces of the polygonal sprocket-wheels are beveled inwardly at their ends to facilitate their passage over the wheels, and are provided with a continuous groove, Q, in their inner sides to receive the guide-bars G. The links O are also provided with sockets R in the bottoms of the grooves Q, adapted to receive the projections S on alternate faces of the wheels I, for rotating said wheels.

To the transverse center of the frame F is attached a stirrup, T, to the upper part of which is connected a lever, U, fulcrumed in a standard, V, and having a retaining device, W, by which the said frame is to be adjusted and supported in positions for holding the chain either in or out of contact with the ground. In the arms J, at the forward end of frame F, is supported a plow, X, for removing clods out of the way of the projections P on the chain.

To the forward end of the frame F is attached a stirrup, A', on which is pivoted a lever, B', the forward end of which is connected to the dropping-slide C' by a vertical pin, D', of sufficient length to allow the said lever to be moved with the frame F without being disengaged from the pin. The rear end of the lever B' is bent downward and terminates in stirrup E', the arms of which are adapted to be struck in turn by bevel projections F', attached to opposite edges of the chain, so that the said slide will be reciprocated in a well-known manner to drop the seed. Where the grain is to be drilled, instead of planted in hills, the projections F' may be provided in such number and order as to give a rapid reciprocation to the slide. Where the grain is to be planted in hills, the projections F' of course will be located at a distance apart corresponding to the distance required between the planted hills.

To facilitate the perfect adjustment of the planter to the check-rows in turning at the ends of a field, I provide the chain M with a graduated scale, G', the position of which, when the planter stops, is indicated by a pointer, H'. At opposite sides of the planter are supported two similar graduated bars, I', corresponding to the scale G', which are to be used in connection therewith in setting the dropping mechanism. If the pointer indicates twenty inches on the scale G' when the planter stops, the driver, before turning round, is to set a stake in the ground at one side of the planter opposite to the number "20" on either of the bars I'. After the planter is turned round in position for starting again, the stake will serve as a pointer on one of the bars I', and may indicate any number thereon—say 30—and if the scale G' is then moved by hand until the pointer H' indicates 30 on said scale, the forward movement of the planter with the chain in contact with the ground will drop the grain in check-row.

What I claim is—

1. In a check-row planter, the combination, with the chain M, having the continuous groove Q, and sockets R, of the guide-bars G, fitted in said groove, the standards H, connecting the guide-bars, and the polygonal wheels I, having projections S, and supported by said standards, substantially as shown and described.

2. In a check-row planter, the combination of the vertically-adjustable frame F and traction-chain M, having lugs F', of the dropping-slide C', having vertical pin D', and the lever B', pivoted near its center, as shown, and having one end loosely connected to the pin D', and the other provided with a stirrup, E', projecting down on opposite sides of the chain, substantially as shown and described.

C. R. DOLLARHIDE.

Witnesses:
A. G. LYNE,
SOLON C. KEMON.